United States Patent

Ford et al.

[11] Patent Number: 5,966,234
[45] Date of Patent: Oct. 12, 1999

[54] RETRO-REFLECTING ELECTROABSORPTION OPTICAL MODULATORS

[75] Inventors: Joseph Earl Ford, Oakhurst, N.J.; Anthony Lodovico Lentine, St. Charles, Ill.; Ted Kirk Woodward, Holmdel, N.J.

[73] Assignee: Lucent Technologies Inc, Murray Hill, N.J.

[21] Appl. No.: 08/881,782

[22] Filed: Jun. 24, 1997

[51] Int. Cl.⁶ .............................. G02F 1/015; G02F 1/19
[52] U.S. Cl. .................... 359/248; 359/247; 359/261; 359/263
[58] Field of Search .................... 359/245–248, 359/237, 261, 263; 385/1–9

[56] References Cited

U.S. PATENT DOCUMENTS

| | | | |
|---|---|---|---|
| 3,854,795 | 12/1974 | Honda | 359/245 |
| 5,155,617 | 10/1992 | Solgaard et al. | 359/245 |
| 5,485,014 | 1/1996 | Jain et al. | 359/245 |
| 5,657,148 | 8/1997 | Feuer et al. | 359/263 |

OTHER PUBLICATIONS

"GaAs MQW Modulators Integrated with Silicon CMOS", by K. W Goossen et al., IEEE Phot. Tech. Lett. Apr. 1995; v.7(4), pp. 360–362.

"Quantum–Well Self–Electro-optic Effect Devices"; by D. A. B. Miller, published in Optical and Quantum Electronics; 1990; vol. 22: pp. S61–S98.

"Folded–Cavity Surface–Emitting InGaAs–GaAs Lasers with Low–Threshold Current Density and High Efficiency", by Y. Cheng et al., published in IEEE Photonics Technology Letters, vol. 7, No. 10, Oct. 1995.

"Leaky Waveguide Modulator Using Distributed Coupling of Light",by Desmulliez, M. P. Y et al., Optics Communications. Aug. 1, 1994; v. 110: pp. 60–66.

"InGaAs–InP (WQW)–N Surface Normal Electroabsorption Modulators Exhibiting Better Than 8:1 Contrast Ratio for 1.55–μm Applications Grown by Gas–Source MBE" by R. N. Pathak et al., published in IEEE Photonics Technology Letters, vol. 6, No. 12, Dec. 1994.

*Primary Examiner*—Georgia Epps
*Assistant Examiner*—Margaret Burke

[57] ABSTRACT

An optical fiber compatible modulator device provides high-contrast levels switchable using modest applied voltages. As a two-port optical modulator, a normal light signal incident at a first port is deflected to a non-normal direction for passage through an absorption layer (e.g., a multiple-quantum well (MQW) layer), the absorption layer having an adsorption characteristic which changes as a function of a voltage applied across it. The non-normal direction light signal exiting the absorption layer is deflected to a normal light signal for output from a second port of the optical modulator. As a one-port optical modulator, a normal light signal received at a first port is deflected to a non-normal direction for passage through an absorption layer. A reflector reflects a non-normal direction light signal exiting the layer back through the layer to the deflector means and is output at the port of the optical modulator.

20 Claims, 3 Drawing Sheets

RETRO-REFLECTING ELECTROABSORPTION OPTICAL MODULATORS

TECHNICAL FIELD OF THE INVENTION

This invention relates to optical modulators and, more particularly, to single and two-port optical modulators that uses reflection and electroabsorption techniques.

BACKGROUND OF THE INVENTION

Normal-incidence optical modulators are attractive devices for optical fiber communications because they can be interfaced to optical fibers more easily than waveguide-based devices. They are also interesting for integration with high-complexity Silicon Complementary Metal Oxide Semiconductor (Si CMOS), because they promise the availability of large amounts of optical Input/Output (I/O) directly to Very Large Scale Integration (VLSI) chips. One example of such devices is described in the article by K. W Goossen et al., entitled."GaAS MQW Modulators Integrated with Silicon CMOS", IEEE Phot. Tech. Lett. 1995 Apr; v.7(4), pp.360–362.

However, there are technological hurdles to be overcome before such devices can be considered for use in lightwave communications applications. The first of these obstacles is the production of modulator devices which operate at the 1.55 micron wavelengths used in most modem telecommunication systems. This has recently been demonstrated by Cunningham, et. al. at the 1996 Conference on Lasers and Electro-optics. A second obstacle is to design a modulator that will function with a modest applied voltage, while still producing the high-contrast (10:1) desired in lightwave systems. Other obstacles relate to optical fiber packaging and engineering.

What is desired is a low cost modulator device which compatibly interfaces to optical fibers and which provides high-contrast levels switchable using modest applied voltages.

SUMMARY OF THE INVENTION

The present invention is directed to solving the prior art problems using an optical fiber compatible modulator device which provides high-contrast levels switchable using modest applied voltages.

In accordance with the present invention, a two-port optical modulator comprises a first deflector means for deflecting a normal (i.e., perpendicular to the device substrate surface) light signal incident at a first port to a non-normal direction for passage through an absorption layer, the absorption layer having an absorption characteristic which changes as a function of a voltage applied across it. A second deflector means then deflects the non-normal direction light signal exiting the layer to a normal light signal for output from a second port of the optical modulator.

In another embodiment, a one-port optical modulator comprises a deflector means for deflecting a normal light signal received at a first port to a non-normal direction for passage through an absorption layer. A reflector means reflects a non-normal direction light signal exiting the absorption layer back through the absorption layer for deflection by the deflector means and output via the port of the optical modulator.

According to other features of the invention, the absorption layer may be a multiple-quantum well (MQW) layer, the deflector means may be a grating or a reflecting surface or may include both a grating and a reflecting surface, the deflector means may include a plurality of reflecting surfaces, the deflector means may be formed by preferential etches in edge surfaces of the optical modulator by ion milling of edge surfaces of the optical modulator, and the absorption layer may include one or more reflecting surfaces for reflecting the light signal during its passage through the absorption layer.

DETAILED DESCRIPTION

Figure 1:
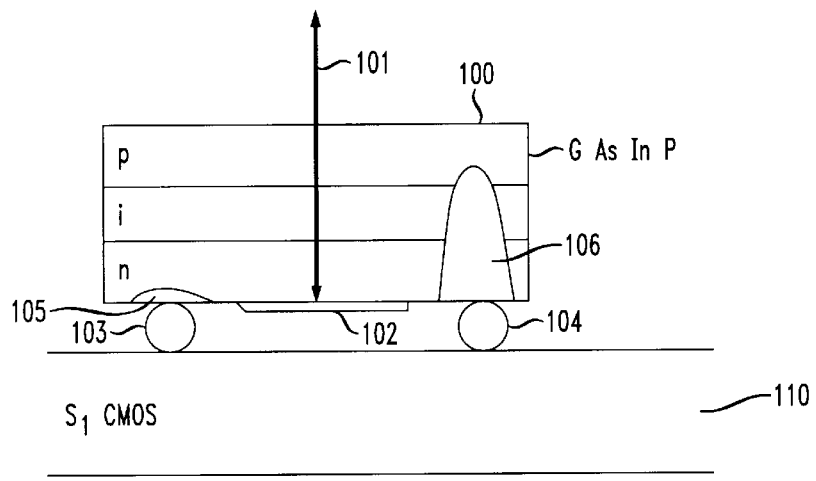
FIG. 1 shows a cross section of a prior art normal-incidence optical modulator device.

With reference to FIG. 1 there is shown an illustrative cross section of a prior art normal-incidence optical modulator device 100. A normal-incidence light signal 101 impinges the optical modulator device 100 and the amount of light that is reflected back, from mirror 102, is a function of the absorption of the device. In our example, the optical modulator device 100 is a p-i-n (Positive-Intrinsic-Negative) device constructed in a well known manner using semiconductor materials. The p-i-n device 100 is constructed for flip-chip mounting, using solder pads 103 and 104, to a Silicon Complementary Metal Oxide Semiconductor (Si CMOS) substrate 110. The solder pads 103 and 104 are used to provide physical and electrical connection between the p-i-n device 100 and Si CMOS substrate 110. The diffusions 105 and 106 connect electrical signals from the solder pads 103 and 104, respectively, to the n and p regions, respectively. When the p-i-n device 100 is biased at a first bias voltage, between the p and n regions, the p-i-n device 100 provides a first level of transmission loss to the impinging and reflected light signal 101. When biased at a second bias voltage, the p-i-n device 100 provides a second level of transmission loss to the impinging and reflected light signal 101. The difference between these transmission losses is called the contrast ratio of the modulator device 100, values of at least 10 to 1 being desirable.

As noted, normal-incidence optical modulators, of the type shown in FIG. 1, have an optical transmission (or reflection, for two-passes through the material) that depends upon the voltage applied to the device. The phenomena can be conveniently modeled by a materials parameter α, the absorption coefficient. The intensity of light transmitted through a material of thickness I having absorption coefficient α can be written $$T = Ie^{-\alpha l}.$$

The contrast ratio of the normal incidence device is related to the change in the optical absorption coefficient α induced by a given change in electric field, and the interaction length over which this change in absorption is experienced by the incident optical beam 101. This electric field is generally derived by applying a voltage across an undoped region (i) of material comprised of the desired material. A common method is to produce a p-i-n diode, in which the intrinsic region contains the desired optically active material. The electric field is then related to applied voltage by $$E = V/d \qquad (1),$$

where E is the electric field, V is the applied voltage, and d is the thickness of the undoped region.

Any material whose optical absorption is dependent on the applied electric field may be employed as the desired optically active material. For example, a bulk semiconductor layer, i.e., a semiconductor layer of uniform composition. For operation near 850 nm, the desired material is a GaAs/AlGaAs multiple-quantum well (MQW) device, as described by D. A. B. Miller in the article "Quantum-Well Self-Electro-optic Effect Devices"; published in Optical and Quantum Electronics; 1990; vol.22: pp. S61–S98, because it has voltage dependent optical absorption at that wavelength.

For operation at 1550 nm, the desired material changes to, for example, an InGaAs/InP MQW. For a reflection modulator in which two passes through the material are possible, the contrast ratio C between two states in which the absorption coefficient of the material ($\alpha$) varies between two states $\alpha_{on}$ and $\alpha_{off}$, as $$C = \exp(\Delta\alpha 2l) \qquad (2)$$

Where $\Delta\alpha = \alpha_{off} - \alpha_{on}$ is the change in absorption induced by the electric field change, and l is the thickness of absorbing material undergoing that change. Another measure of modulation performance is $\Delta R$, the change in reflectivity of a reflection-based modulator between the two states. This can be expressed as $$\Delta R = R_{off}(C-1), \qquad (3)$$

where $$R_{off} = r_2 \exp(-2l\alpha_{off}). \qquad (4)$$

Here $\alpha_{off}$ is the absorption of the device in the low-reflectivity state, and $r_2$ is the reflectivity of the mirror 102 underneath the modulating region.

Assuming the fundamental absorption versus the electric field performance of the material is unchanged, the only way to improve the optical modulation obtained for a given voltage difference is to attempt to increase the interaction length at the electric field produced by that voltage. If one simply increases the interaction length l without addressing the electric field issue, the result is an increase in operating voltage via Eqn. 1. Such an increase in interaction length has been implemented for 1550 nm modulators, e.g., see the previously referenced Cunningham, et. al article. This has resulted in an increase of the required operating voltage to roughly 50 V, a value incompatible with many integrated-circuit technologies.

For 850 nm modulators, which have recently been integrated with Si CMOS (e.g., see the previously referenced article by K. W Goossen et al), the problem is somewhat different. Modulation performance, as determined by Eqns. (3) and (4) does not need to be quite so high, and the material properties are somewhat better. This results in reasonable performance with about 5 V of drive voltage. While this is compatible with many current-generation IC processes, the operating voltage of the IC processes is steadily decreasing. This will result in increasing stress on the modulation performance. Thus there is a continuing need for improving the modulation per unit applied voltage.

Two-Port Device

Figure 2:
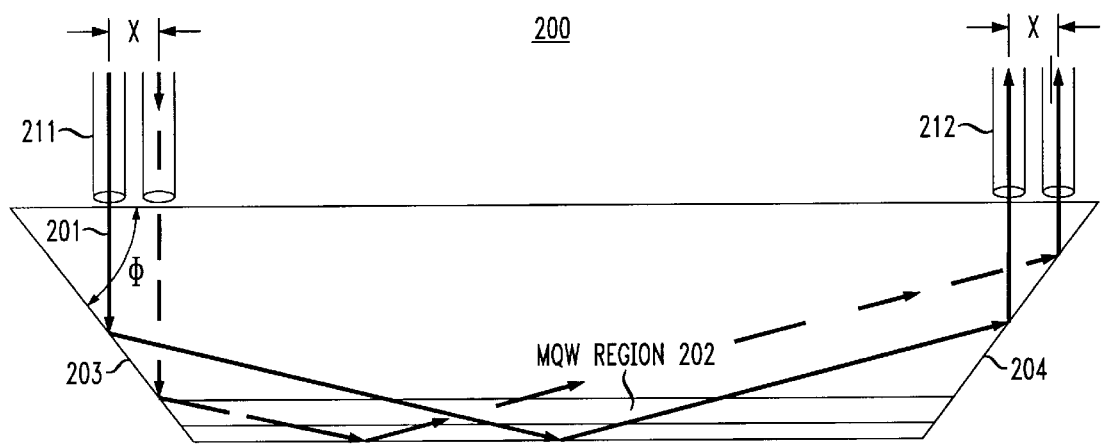
FIG. 2 shows a cross-section of an illustrative two-port optical modulator constructed in accordance with the present invention with a facet angle φ greater than 45 degrees.

With reference to FIG. 2, there is shown a cross-section of an illustrative Retro-Reflecting Electroabsorption Optical (hereinafter RETRO) modulator device (also referred to herein as a RETRO device or device) constructed in accordance with the present invention. The RETRO device 200 shown in FIG. 2 (not drawn to scale) may be a two-port device, i.e., it includes a separate input and output ports. The input port is the location where the light signal 201, illustratively provided from an optical fiber 211, enters the device 200. The output port is the location where the light signal 201 exits the device 200, illustratively to optical fiber 212.

Our invention decreases the operating voltage of a normal-incidence modulator of FIG. 2 while maintaining high contrast performance. This goal is accomplished by increasing the interaction length and hence the adsorption of the light signal 201 within the MQW region or layer 202 of modulator 200. This is accomplished by passing the light at an oblique angle through the MQW layer 202. Absorption can be further increased by passing the light signal 201 multiple times at an oblique angle through the MQW layer 202, rather than only two times perpendicular to it—as is done in the prior art modulator shown in FIG. 1. Providing an oblique angle entry into the MQW region 202 while providing substantially normal-incidence addressing to the device 200 is achieved by the use of an angled facets 203 and 204, making an angle $\phi$ of greater than 45 degrees, formed at the side-wall or end surfaces of the device 200. Using an facet angle of at least 45 degrees insures that the light 201 passes through the MQW region 202 obliquely, thereby providing an increased interaction therebetween. The result is an increased modulation for a given voltage as compared to a normal-incidence devices of FIG. 1.

If angle $\phi$ is greater than 45 degrees, the device operates as described above. If the angle is exactly equal to 45 degrees, the light can be made to reach the MQW region 202, but there would be no middle reflection as shown in FIG. 2. For $\phi$ angles less than 45 degrees, the operation is shown with reference to FIG. 3.

Figure 3:
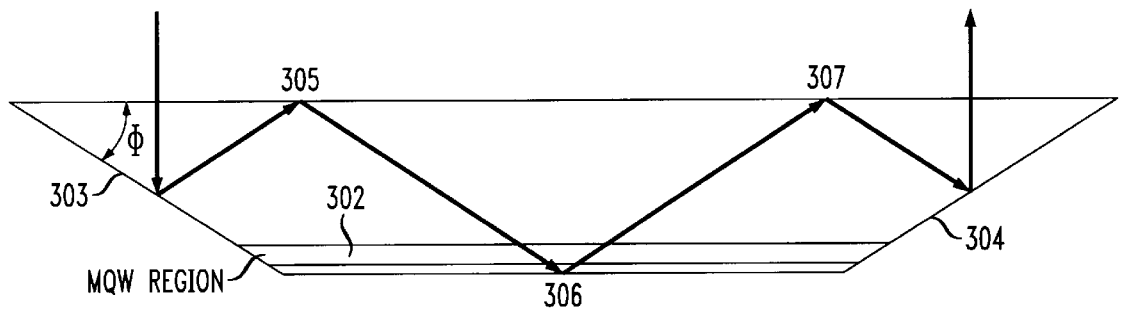
FIG. 3 Illustrates the operation of a two-port RETRO modulator where the facet angle φ is less than 45 degrees.

FIG. 3. Illustrates the operation of another RETRO device where the angle $\phi$ is less than 45 degrees. The fabrication of our inventive RETRO device relies upon the ability to create optically smooth mirror facets, e.g., 303 and 304, in the semiconductor material suitable for light beam transport. The design of FIG. 3 insures that all light 301 reflections at surfaces 303, 305, 306, 307, and 304 are at angles greater than the critical angle for total internal reflection $\phi > \phi_c$, so there is no concern with loss other than scattering loss at the reflective surfaces. Care must be taken to obtain sufficiently smooth surfaces, for roughness will result in scattering and loss. The degree of smoothness should be comparable or less than the wavelength of light in the material.

If the thickness of the modulating region (MQW region in FIGS. 1–3) is d, then the interaction length for the prior art two-pass normal-incidence modulator device of FIG. 1 is 2d, while for a device of the type shown in FIG. 2 or FIG. 3 it is given by 2d/sin (90–2$\phi$), or in general nd/sin (90–2$\phi$), where n is the number of passes through the modulating medium (MQW). For $\phi$=29 degrees, this increases the interaction length for n=2 relative to a perpendicularly addressed device by a factor of 1/sin (32)=1.88. For $\phi$=40 degrees, the enhancement is a factor of 1/sin(10)=5.76. The length of the RETRO modulator device may be extended to permit multiple passes through the materials, thus permitting n=4, 6 and yielding further increase in interaction length relative to a two-pass, perpendicularly addressed device. For instance, if n=4 in the φ=29 degree device, the improvement in interaction length becomes 2 (1.88)=3.76.

The fabrication of our RETRO modulator device of FIG. 2 and 3 may be done using a well known preferential wet chemical etch. Such etches have an orientation dependence related to the crystal planes in the material, and therefore tend to reproduce a given angle φ for different mixtures. For example, etches capable of producing φ=29 degrees in GaAs/AlGaAs materials have been found, and etches capable of producing φ=40 degrees in InP/InGaAs materials have been found. Such etches enable the production of the desired geometry with good uniformity. It is known that preferential etches can be used to create mirror facets such as these. See, for example, chapter 9 of the book by Ghandi, Sorab, K., "VLSI Fabrication Principles", (Wiley, New York, 1994) ISBN 0-471-58005-8, which is incorporated by reference herein. Further, ion milling techniques have been used to produce 45 degree turning mirror facets for detector coupling and surface coupling of in-plane laser structures as described by Y. Cheng et al. in the article "Folded-Cavity Surface-Emitting InGaAs—GaAs Lasers with Low-Threshold Current Density and High Efficiency", published in IEEE Photonics Technology Letters, Vol. 7, No. 10, October 1995.

Finally, after processing of the mirror facets, the sample is inverted, attached to an appropriate carrier substrate (e.g., 110 of FIG. 1), which might, for example, contain electronic interface circuits, and the overlying substrate is removed, leaving the shape depicted. This attachment mechanism is detailed in the previously referenced Goossen, et. al. article, which is incorporated by reference herein.

The two-port RETRO device design offers other advantages besides the increased MQW layer interaction length. Two-port devices have advantages for fiber-coupling, in that different fibers can be used to input and output light to the device, in comparison the one-port device design uses the same fiber for both input and output. When a single fiber is used, a coupler is typically employed to separate input from output. Simple couplers impose at least 6 dB of signal loss, while the two-port device avoids the use of such a coupler. Additionally, a two-port device designs can be made such that the separation of input and output ports coincides with fiber-to-fiber spacing, making packaging easier.

With reference to FIG. 2, when an odd number of bounces occur in the RETRO device 200, misalignment of the input 211 and output 212 fibers is compensated. If we imagine that the input and output fibers are registered with respect to each other, we desire to align the input and output ports of the RETRO device 200, respectively, in front of the input and output fibers. As shown, if we misalign the input fiber, e.g., by an distance X, but light is still coupled into the device 200, the output beam will also be displaced by a distance X in the same direction. This resulting inherent alignment compensation eases any fiber-to-device alignment problems associated with using our two-port RETRO device designs.

Single-Port Device

Figure 4A:
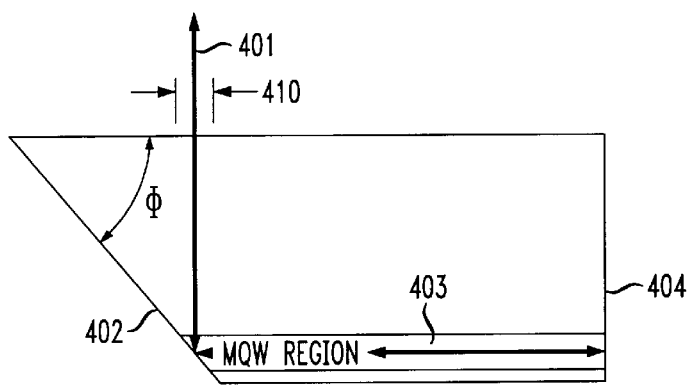
FIGS. 4a and 4b show two arrangements of a RETRO modulator implemented as a single-port device.
Figure 4B:
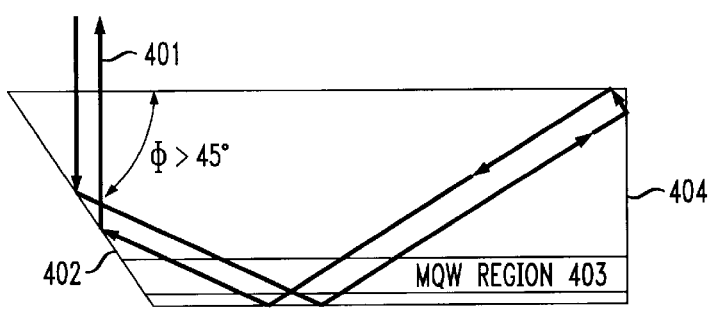

As shown in FIG. 4a, and in according to another aspect of invention, our RETRO modulator may be implemented as a single-port device, e.g., by slicing a φ=45 degree, two-port RETRO modulator device of FIG. 2 or 3 in half, also referred to as a folded RETRO device. A light signal 401 is reflected off a 45 degree facet angle 402, passes through the MQW layer 403, is reflected back in the opposite direction by optical mirror 404, again passes through MQW layer 403, and is reflected out of the single port by facet angle 402. Additionally, angles other than 45 degrees can also be utilized. For example, in FIG. 4b shows a light signal reflection path for a device having an angle greater than 45 degrees.

It should be noted, that the modulator of FIG. 4 has an aperture 410 for coupling a light beam which is limited to the thickness of the MQW layer 403.

Figure 5:
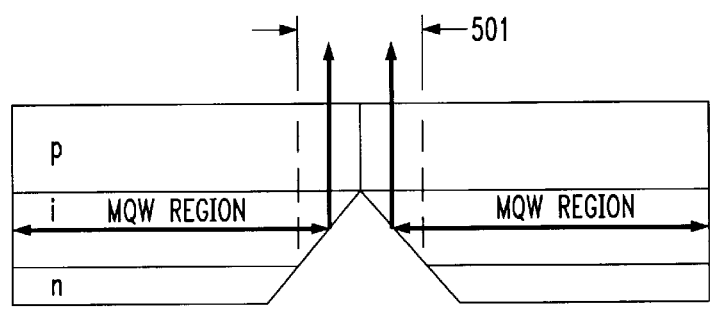
FIG. 5 shows a single-port device having an increased aperture.

With reference to FIG. 5, this limitation can be alleviated by combining two of the above structures to double the available aperture 501. Such a device may be realized by either etching a V-groove in the material or by butt-joining two FIG. 4 type devices end-to-end.

Grating Coupling

Figure 6:
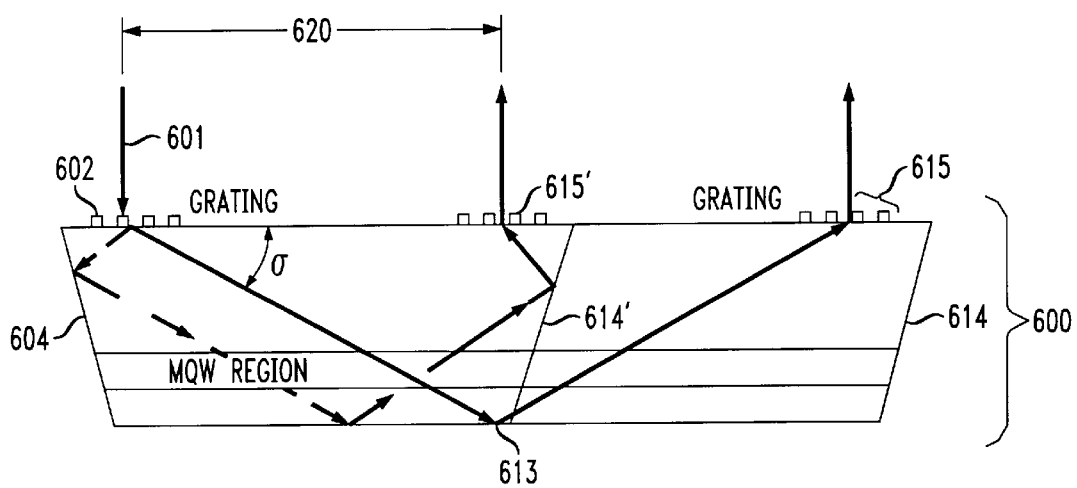
FIG. 6 shows a two-port RETRO modulator implemented using two gratings.

With reference to FIG. 6, there is shown another method of coupling light into the RETRO modulator device 600. This method relies upon a diffraction of the light to the desired angle. Such a bending of the incident light beam 601 is possible by fabricating of a surface grating, 602 (and 615), on the top surface of the RETRO modulator device 600. The use of surface gratings for deflection of light beams into substrates is well known, for example see the article by J. Jahns entitled "Planar Packaging of Free-Space Optical Interconnections", Proc. IEEE; 1994, Nov., v.82 (11): pp.1623–1631, which is incorporated by reference herein.

The surface grating embodiment alleviates some of the constraints imposed on RETRO modulator device design by the physical characteristics of the wet-etching used to create the facets. However, grating formation requires fine-line lithography and carefully controlled etching. Additionally, there are also efficiency questions associated with the amount of light that can be diffracted into the desired angle. Implementation may require high degrees of angular deflection θ, and some light loss due to undesired diffraction orders may have to be tolerated. Notwithstanding these limitations, the RETRO modulator device 600 type implementation may be desirable in certain applications such as those in which a large aperture onto which to direct the input optical beam is required.

One such application may be to combine a grating 602 together with an angled facet 604 and combine grating 615 with facet 614 to produce a RETRO modulator device 600 which has a smaller overall length, i.e., 620. As shown the light signal 601 is deflected to the left by grating 602, reflected by facet 604 through the MQW layer, reflected off surface 613 and facet 614 to grating 615 where it is deflected at a normal angle from the RETRO modulator device 600. Additionally, the combined use of gratings and facets may be used to implement any of the previously described RETRO modulator device of FIGS. 1–5.

The present invention has been described for use with surface normal incidence light signals, which is typically the most practical design. However, it should be understood that, surface coupling at non-normal incidence may also be utilized using techniques such as those described by Desmulliez, M. P. Y et al in the article "Leaky Waveguide Modulator Using Distributed Coupling of Light", Optics Communications. Aug 1, 1994; v.110: pp.60–66.

What has been described is merely illustrative of the application of the principles of the present invention. Other arrangements and methods can be implemented by those skilled in the art without departing from the spirit and scope of the present invention.

We claim:

1. A two-port optical modulator device comprising
    a first deflector means, formed at a non-45 degree angle to a top surface of the device, for deflecting a light signal incident at a first port, at a normal angle to the top surface of the device, to a non-normal direction, with respect to the top surface of the device, for passage through an absorption layer at an oblique angle, reflection off a bottom surface of the device and passage back through the absorption layer at an oblique angle, the absorption layer having an absorption characteristic which changes as a function of a voltage applied across the absorption layer and a second deflector means, formed at a non-45 degree angle to the top surface of the device, for deflecting the light signal exiting the absorption layer to a normal light signal for output from a second port of the optical modulator and wherein a lateral displacement, in a first direction, of the light signal inputted to the first port produces an equal lateral displacement, in said first direction, of the light signal outputted from the second port.

2. The two-port optical modulator of claim 1 wherein the absorption layer is a semiconductor layer of uniform composition.

3. The two-port optical modulator of claim 1 wherein the absorption layer is a multiple-quantum well (MQW) layer.

4. The two-port optical modulator of claim 1 wherein one of the first or second deflector means is a grating.

5. The two-port optical modulator of claim 1 wherein at least one of the first or second deflector means is a reflecting surface.

6. The two-port optical modulator of claim 1 wherein at least one of the first or second deflector means includes a grating and a reflecting surface.

7. The two-port optical modulator of claim 1 wherein the multiple-quantum well (MQW) layer includes one or more reflecting surfaces for reflecting the light signal during its passage through the layer.

8. The two-port optical modulator of claim 1 wherein at least one of the first or second deflector means includes a plurality of reflecting surfaces.

9. The two-port optical modulator of claim 1 wherein the first and second deflector means are produced by preferential etches in edge surfaces of the optical modulator.

10. The two-port optical modulator of claim 1 wherein the first and second deflector means are produced by ion milling of edge surfaces of the optical modulator.

11. The two-port optical modulator of claim 1 wherein the first and second deflector means are produced by reactive ion etching of edge surfaces of the optical modulator.

12. A one-port optical modulator device comprising a first deflector means for deflecting a light signal received at a first port, at a normal angle to a top surface of the device, to a non-normal direction, with respect to the top surface of the device, for passage through an absorption layer, the absorption layer having an absorption characteristic which changes as a function of a voltage applied across the absorption layer and a second first deflector means for reflecting a non-normal direction light signal exiting the absorption layer back through the absorption layer for deflection by the deflector means and output from the first port of the optical modulator.

13. The one-port optical modulator of claim 12 wherein the absorption layer is a semiconductor layer of uniform composition.

14. The one-port optical modulator of claim 12 wherein the absorption layer is a multiple-quantum well (MQW) layer.

15. The one-port optical modulator of claim 12 wherein the first deflector means is a grating.

16. The one-port optical modulator of claim 12 wherein the first deflector means is a reflecting surface.

17. The one-port optical modulator of claim 12 wherein the non-normal direction light signal passes obliquely through the absorption layer to the second deflector means.

18. The one-port optical modulator of claim 12 wherein the deflector means is produced by a preferential etch in an edge surface of the optical modulator.

19. The one-port optical modulator of claim 12 wherein the deflector means is produced by ion milling of an edge surface of the optical modulator.

20. The one-port optical modulator of claim 12 wherein the deflector means is produced by reactive ion etching of an edge surface of the optical modulator.

* * * * *